(12) United States Patent
Ashe

(10) Patent No.: US 12,038,127 B1
(45) Date of Patent: Jul. 16, 2024

(54) DEVICE AND METHOD FOR MOUNTING AN OBJECT TO A VEHICLE WHEEL

(71) Applicant: Daniel Thomas Ashe, Carlsbad, CA (US)

(72) Inventor: Daniel Thomas Ashe, Carlsbad, CA (US)

(*) Notice: Subject to any disclaimer, the term of this patent is extended or adjusted under 35 U.S.C. 154(b) by 0 days.

(21) Appl. No.: 17/699,976

(22) Filed: Mar. 21, 2022

Related U.S. Application Data

(60) Provisional application No. 63/139,172, filed on Jan. 19, 2021.

(51) Int. Cl.
*G01B 5/255* (2006.01)
*F16M 13/02* (2006.01)

(52) U.S. Cl.
CPC .............. *F16M 13/02* (2013.01); *G01B 5/255* (2013.01)

(58) Field of Classification Search
CPC ...... F16M 13/02; G01B 5/255; G01B 11/275; G01B 2210/10; B60B 2340/34
USPC .................................................. 33/203.18
See application file for complete search history.

(56) References Cited

U.S. PATENT DOCUMENTS

| | | | | |
|---|---|---|---|---|
| 6,282,799 | B1* | 9/2001 | Warkotsch | G01B 5/255 33/203.18 |
| 6,622,389 | B1* | 9/2003 | Pellegrino | G01B 5/255 33/562 |
| 7,578,066 | B1* | 8/2009 | Pellegrino | G01B 5/255 248/220.21 |
| 2021/0025700 | A1* | 1/2021 | Kram | G01B 5/255 |

* cited by examiner

*Primary Examiner* — Bradley Duckworth
(74) *Attorney, Agent, or Firm* — Plager Schack LLP; Mark H. Plager; Naomi Mann

(57) ABSTRACT

Disclosed is a mounting device configured to attach to a vehicle wheel for mounting an alignment tool, such as a target/sensor, camera, alignment indicator, and the like, to the vehicle wheel. The mounting device may comprise at least two magnetic attachment sites each configured to magnetically attach to a lug stud on the vehicle wheel, and an alignment tool attachment component coupled to the at least two magnetic attachment sites.

9 Claims, 4 Drawing Sheets

DEVICE AND METHOD FOR MOUNTING AN OBJECT TO A VEHICLE WHEEL

RELATED APPLICATION

This application claims benefit to U.S. Provisional Application No. 63/139,172 filed on Jan. 19, 2021, which is incorporated by reference herein in its entirety.

BACKGROUND

The present disclosure relates generally to devices and methods for mounting target/sensors and other objects to the wheel of a vehicle.

Devices for attaching various types of target/sensors or another object to a vehicle wheel may not accurately and rapidly mount to the wheel. Some magnetic clamp devices are configured to mount to the wheel lug nuts but are not sufficiently reliable in obtaining the repeatable performance needed in vehicle measurement systems. As such, an improved system for mounting a target/sensor or other object to a vehicle wheel is desirable.

SUMMARY

According to various embodiments, disclosed is a mounting device configured to attach to a vehicle wheel for mounting an object, such as a target/sensor, camera, alignment indicator, and the like ("alignment tool), to the vehicle wheel. In embodiments, the mounting device may comprise at least two magnetic attachment sites each configured to magnetically attach to a lug stud on the vehicle wheel; and an alignment tool attachment component coupled to the at least two magnetic attachment sites, wherein the at least two magnetic attachment sites are fixed in position with respect to one another to guide a specific positioning of the mounting device with respect to the vehicle wheel when the mounting device is attached to the vehicle wheel, and wherein the target/sensor attachment component is configured to support said object to be mounted to the vehicle wheel.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
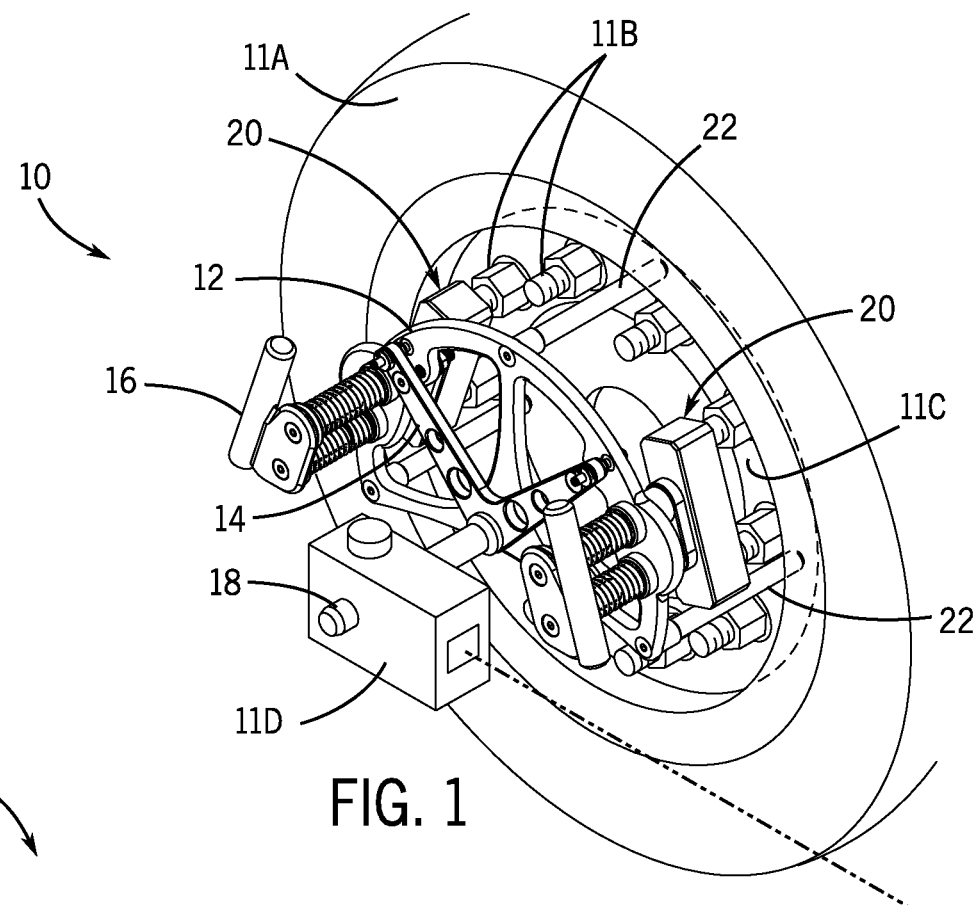
FIG. 1 is a perspective view of a mounting device for mounting an object to a vehicle wheel, the device shown in use for mounting a target/sensor, in accordance with certain embodiments.
Figure 2:
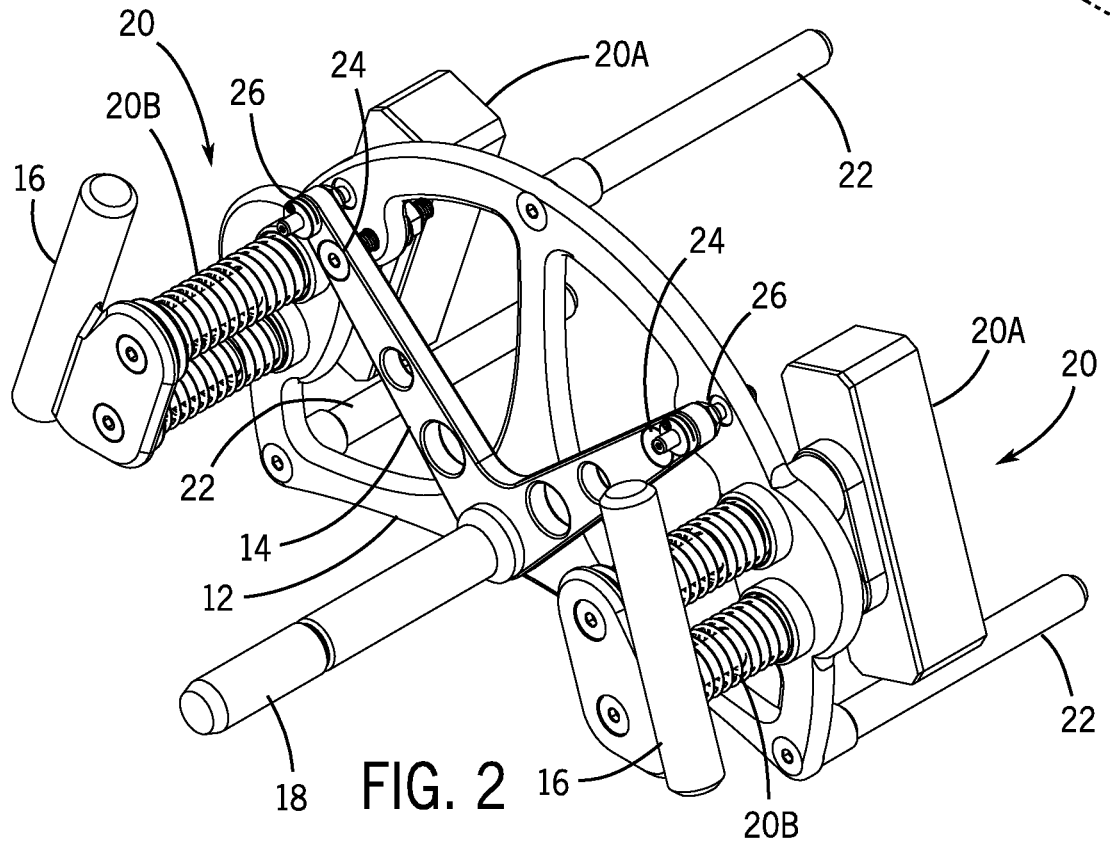
FIG. 2 is a perspective view of the mounting device.
Figure 3:
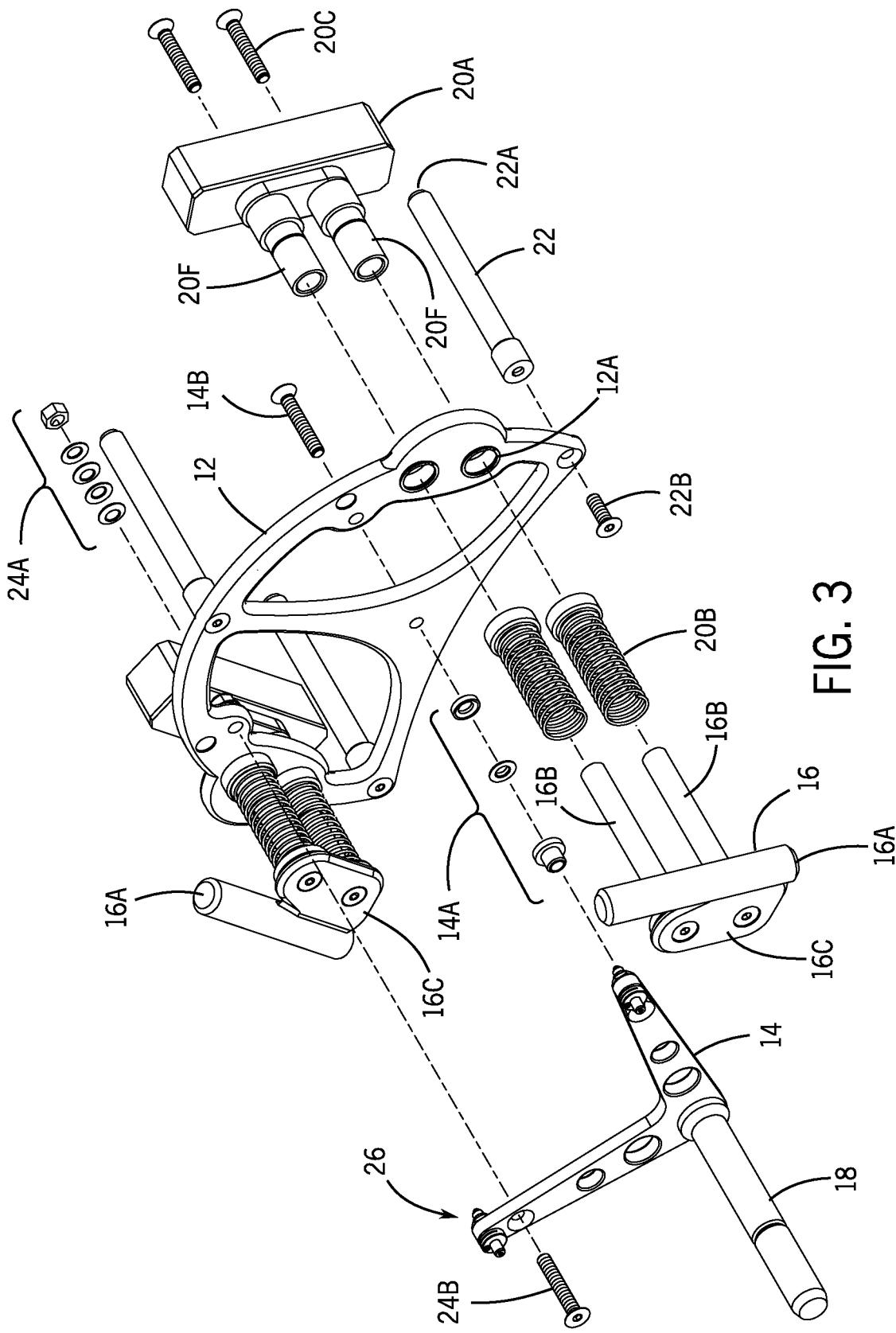
FIG. 3 is an exploded perspective view thereof.

According to various embodiments as depicted in FIGS. 1-6, disclosed is a mounting device 10 and method 30 for mounting and/or calibration of an object 11D such as a target/sensor, camera, alignment indicator, and similar object (collectively referred to as "alignment tool") to a wheel 11A and/or a hub of a vehicle. In embodiments, the disclosed subject matter uses magnets to quickly attach the mounting device to the wheel/hub studs with accurate positioning. In certain embodiments, magnetic elements may be used for secure mounting to multiple attachment points. In further embodiments, the multiple attachment points may comprise neighboring wheel studs. In certain embodiments, reference legs are provided within the mounting device for stabilization. In further embodiments, calibration elements are provided for adjustment of the mounted object.

In embodiments as depicted in FIG. 1-5, mounting device 10 may generally comprise a magnetic mounting component 20 which supports an alignment tool attachment component 18. (The term "alignment tool attachment component" as used herein shall refer to a component to which a target/sensor, camera, alignment indicator, or other similar object may be attached). The magnetic mounting component is configured to magnetically attach to lug studs 11B on wheel 11A or wheel hub base 11C (also referred to as "wheel rim base surface"), wherein magnets within magnetic mounting component 20 guide the positioning of device 10 for quick and effortless attachment. In certain embodiments, the device comprises multiple fixed magnetic attachment sites or magnetic attachment pockets, which are each configured to attach to a lug stud. As the magnetic attachment pockets are generally fixed in position with respect to one another, they guide a specific positioning of the mounting device with respect to the vehicle wheel. Once attached, alignment tool attachment component 18 may support a target/sensor, or other object, such as a camera, alignment indicator, or other similar object against wheel 11A. In embodiments, alignment tool attachment component 18 may be a spindle, but is not limited to this embodiment. It shall be appreciated that the alignment tool attachment component may have different configurations in alternate embodiments to accommodate any type of target/sensor, camera, alignment indicator, and/or other similar object to be mounted.

In embodiments, mounting device 10 may further comprise a calibration platform 14 configured to enable calibration/position adjustment of alignment tool attachment component 18 to ensure it is within specifications. In one embodiment, calibration platform 14 may include a course adjustment component 24 and a fine adjustment component 26. In further embodiments, mounting device 10 may comprise at least one handle 16. In some further embodiments, mounting device 10 may comprise reference legs 22 that assist in stabilizing or balancing device 10 when mounted to wheel 11A.

In certain embodiments, magnetic mounting component 20, alignment tool attachment component 18, calibration platform 14, fine adjustment component 26, and reference legs 22 may be coupled to a mounting plate 12. In certain embodiments, mounting plate 12 may have a semi-circular configuration, as shown in the figures, but is not limited to this option.

In some embodiments, mounting device 10 may comprise two magnetic mounting components 20 each extending from a rear side of mounting plate 12 and coupled to each of a pair of handles 16, which extend from a front side of the mounting plate. In one embodiment, each magnetic mounting component 20 may include a magnetic component main body 20A, and a pair of tube shafts 20F coupled to a front side of main body 20A. Each handle 16 may comprise an elongated main handle component 16A and a pair of internally threaded tube shafts 16B configured to insert within the pair of tube shafts 20F of magnetic mounting component 20. In one embodiment, each handle 16 may include a connector body 16C between the elongated main handle component and the internally threaded tube shafts but is not limited to this embodiment. The pair of tube shafts 20F of magnetic mounting component 20 may insert through a pair of openings 12A within mounting plate 12, wherein a wide collar on a lower end of each of the tube shafts provides an insertion stop. Each handle may then be attached to each magnetic mounting component via magnetic mounting screws 20C passed through and threaded into the internally threaded tube shafts 16B of handles 16. In certain embodiments, a spring 20B may be disposed around each of the pair of tube shafts of main body 20A, a shown.

Figure 4:
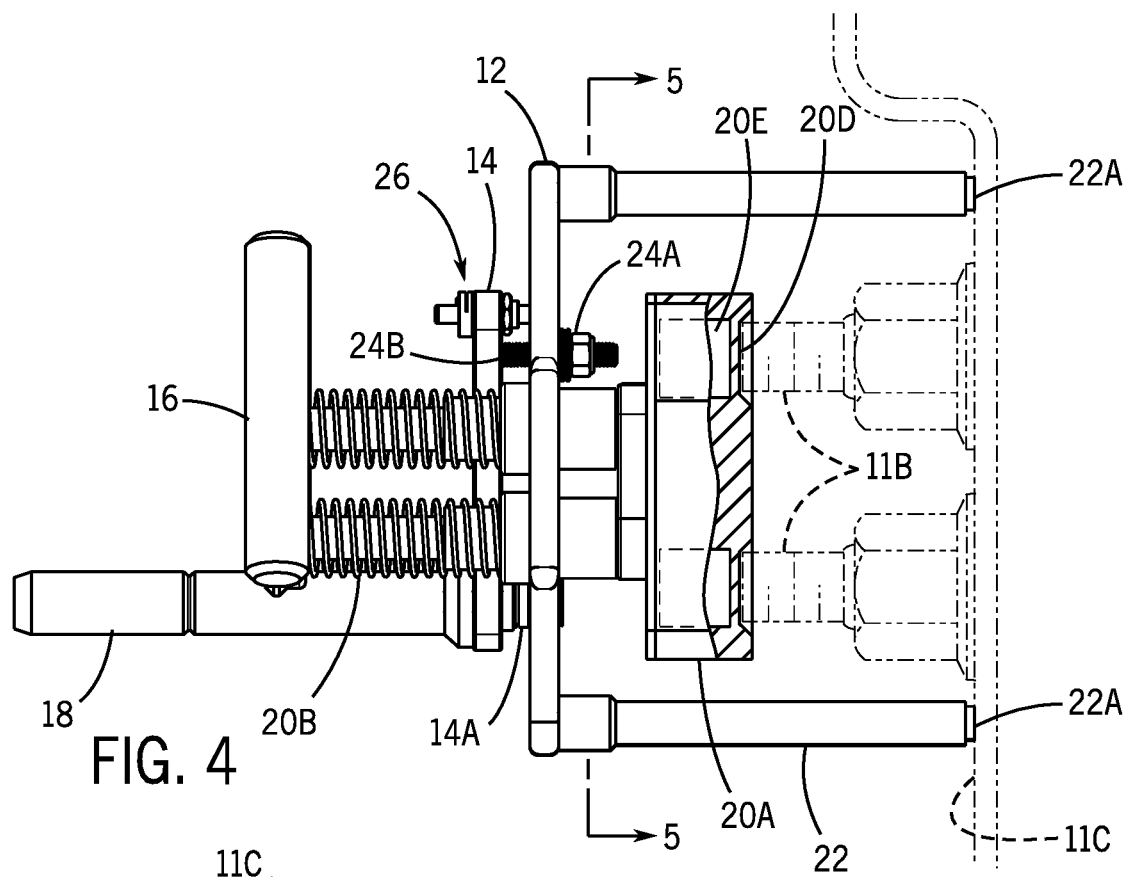
FIG. 4 is a side elevation view thereof.
Figure 5:
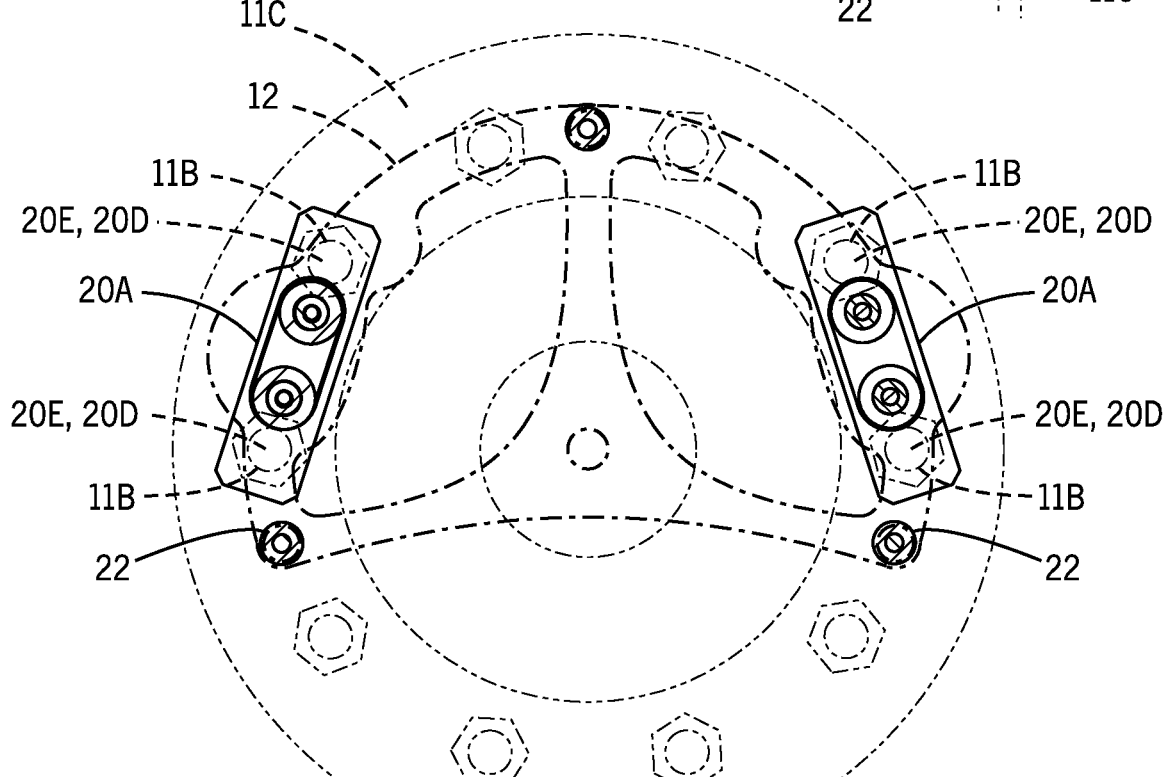
FIG. 5 is a detailed cross-sectional view taken along line 5-5 of FIG. 4

In certain embodiments as best depicted in FIGS. 4 and 5, magnetic mounting components 20 each comprise a pair of stud alignment pockets 20D on a rear side of main body 20A, wherein each stud alignment pocket 20D includes a magnet 20E. In embodiments, the pair of stud alignment pockets 20D within each main body 20 are configured to align with and receive neighboring lug studs 11B on wheel 11A/wheel hub base 11C (see FIG. 1). As such, a first magnetic mounting component 20 of mounting device 10 may attach to a first pair of neighboring lug studs 11B, and a second magnetic component 20 of mounting device 10 may attach to a second pair of neighboring lug studs 11B, wherein the first pair of neighboring lug studs and the second pair of neighboring lug studs do not necessarily neighbor each other. In one embodiment, the first pair of neighboring lug studs and the second pair of neighboring lug studs may be offset by a by an angular distance which encompasses two additional lug studs in between the first and second pair of lug studs, as shown in FIG. 1. It shall be appreciated that the number and positioning of magnetic components within device 10 may vary in alternate embodiments. Additionally, the size of magnetic component main body 20 and/or distance between stud alignment pockets 20D and/or size of each stud alignment pocket 20D may vary in alternate embodiments, based on the size and type of wheel.

In certain embodiments, reference legs 22 may be attached to the rear side of mounting plate 12, alongside magnetic mounting components 20, and generally extend in perpendicular orientation to the major plane of the mounting plate. In embodiments, contact legs 14 are configured to help the user align device 10 parallel to the wheel, and may further counterbalance a torque which may be imposed by the weight a mounted object. In some embodiments, each reference leg 22 may include an internally threaded front end, and may be attached to the mounting plate via a leg mounting screw 22B inserted through an opening on mounting plate 12, from the front side of the mounting plate to threadably engage the internally threaded front end of the leg. In some embodiments, each reference leg 22 may comprise a contact foot 22A providing a smooth surface configured to contact wheel hub base 11C when mounting device 10 is installed. In embodiments, mounting device 10 may comprise three contact legs 22, which may be symmetrically positioned about mounting plate 12, wherein one leg may be coupled at a top central location of the plate, and the two other legs may be coupled at the bottom left and right sides of the plate as shown in the figures. As such, each of the magnetic mounting components may be positioned between two legs to provide stability and balance when installing the device.

In certain embodiments, calibration platform 14 may be attached to the front side of mounting plate 12 and may support alignment tool attachment component 18 that extends frontwards from the calibration platform. In some embodiments, alignment tool attachment component 18 is configured to extend from a central location and in perpendicular orientation with respect to mounting plate 12 and calibration platform 14, as shown. In some embodiments, attachment component 18 may comprise a spindle including an internally threaded shaft configured to engage with a platform mounting screw 14B which may be inserted through a central opening within mounting plate 12 and from the rear side of mounting plate 12 to attach the calibration platform 14 and alignment tool attachment component 18 to the mounting plate. In further embodiments, other attachment hardware 14A comprise various spacer and/or washer components may be provided between mounting screw 14B and calibration platform 14 to provide a distance between calibration platform 14/attachment component 18 and mounting plate 12.

In further embodiments, course adjustment component 24 and fine adjustment component 26 within calibration platform 14 are configured to adjust a tilt of calibration platform 14/attachment component 18 with respect to mounting plate 12/wheel 11A/wheel hub base 11C. In one embodiment, course adjustment component 24 may comprise course adjustment hardware 24A and course adjustment screws 24B which may enable a user to adjust the distance between the calibration platform and mounting plate on the right and/or left side, wherein a distance deferential between the left and right sides causes the calibration platform to tilt with respect to the mounting plate. Likewise, fine adjustment component 26 provides similar hardware to enable distance adjustment for a finer tuned distance adjustment.

Figure 6:
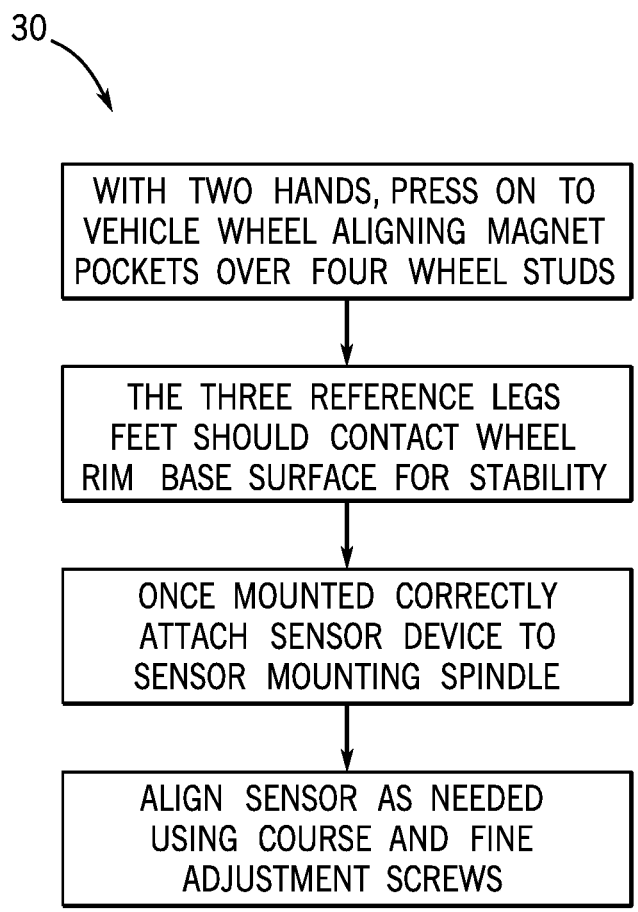
FIG. 6 is a flow chart for a method for mounting an object to a vehicle wheel.

With specific reference to FIG. 6, a user may mount an object such as a target/sensor, camera, alignment indicator, etc., to a wheel by first attaching the mounting device to the wheel via attachment of the magnetic mounting assembly to the lug studs. In some embodiments, the user may hold the mounting device with both hands, using the handles. The user may then press the device onto the vehicle wheel while aligning the magnet pockets over four corresponding studs, as the feet of the reference legs contact the wheel rim base surface for stability. Once magnetic mating is complete, and the device is securely mounted, the user may attach an object to the mounting spindle. The attached object may then be aligned as needed using the course and fine adjustment components.

The disclosed subject matter provides a device and method for mounting an object to a wheel, which is reusable and repeatable, as well as quick and accurate. By magnetically attaching to the wheel studs, the disclosed device achieves a stronger attachment in comparison to conventional mounting devices. Additionally, the use of adjacent studs forces proper alignment and assures the user that the mounting is correctly positioned.

It shall be appreciated that the disclosed mounting device 10 and method 30 can have multiple configurations in different embodiments. For example, the magnetic components and/or positioning of the magnetic components may be different in alternate embodiments.

It shall be appreciated that the components of mounting device 10 described herein may comprise any alternative known materials in the field and be of any size and/or dimensions. It shall be appreciated that the components of mounting device 10 described herein may be manufactured and assembled using any known techniques in the field. In one embodiment, the device may be made from machined steel and/or aluminum components that mount together via machined screws. In certain embodiments, device hardware such as spacer components may be plastic. Furthermore, the various components of mounting device 10 may be provided as an assembled and/or integral unit or may be provided as a kit/assembly of parts according to alternate embodiments.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A mounting device configured to attach to a vehicle wheel for mounting an alignment tool to the vehicle wheel, the mounting device comprising:
    at least two magnetic attachment sites each configured to magnetically attach to a lug stud on the vehicle wheel; and
    an alignment tool attachment component coupled to the at least two magnetic attachment sites,
        wherein the at least two magnetic attachment sites are fixed in position with respect to one another to guide a specific positioning of the mounting device with respect to the vehicle wheel when the mounting device is attached to the vehicle wheel, and
    wherein the alignment tool attachment component is configured to support said alignment tool to be mounted to the vehicle wheel,
    the magnetic attachment sites comprising at least two magnetic attachment pockets provided within a magnetic component main body, wherein the magnetic attachment pockets within the magnetic component main body are configured to receive neighboring lug studs on the vehicle wheel.

2. The mounting device of claim 1, wherein the mounting device comprises a first magnetic component main body and a second magnetic component main body, the first magnetic component main body configured to attach to a first pair of neighboring lug studs, and the second magnetic component main body configured to attach to a second pair of neighboring lug studs, wherein the first pair of neighboring lug studs and the second pair of neighboring lug studs do not neighbor each other.

3. The mounting device of claim 1, further comprising:
    a mounting plate; and
    a handle extending from a front side of the mounting plate, and coupled to the magnetic component main body,
    the handle and magnetic mounting component being coupled by at least one shaft which passes through an opening within the mounting plate, wherein the magnetic component main body is coupled at a rear side of the mounting plate, and the handle is coupled at a front side of the mounting plate.

4. The mounting device of claim 3, further comprising a spring disposed around the at least one shaft, between the handle and mounting plate.

5. The mounting device of claim 3, further comprising a calibration platform coupled to the mounting plate at the front side of the mounting plate, wherein the alignment tool attachment component is coupled to a front side of the calibration platform, wherein the calibration platform configured to enable calibration and/or position adjustment of alignment tool attachment component.

6. The mounting device of claim 3, further comprising at least one reference leg coupled to the mounting plate at the rear side of the mounting plate, the at least one reference leg configured to contact a wheel hub base of the vehicle wheel when the mounting device is attached to the vehicle wheel.

7. The mounting device of claim 1, further comprising a calibration platform configured to enable calibration and/or position adjustment of the alignment tool attachment component, wherein the alignment tool attachment component is coupled to the calibration platform, the calibration platform being coupled to the at least two magnetic attachment sites.

8. The mounting device of claim 1, further comprising at least one reference leg, the at least one reference leg configured to contact a wheel hub base of the vehicle wheel when the mounting device is attached to the vehicle wheel.

9. The mounting device of claim 1, wherein the alignment tool to be mounted is a target/sensor, camera, and/or alignment indicator.

* * * * *